US011875351B2

(12) United States Patent
Walters et al.

(10) Patent No.: US 11,875,351 B2
(45) Date of Patent: Jan. 16, 2024

(54) METHODS AND ARRANGEMENTS TO DISTRIBUTE A FRAUD DETECTION MODEL

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 411 days.

(21) Appl. No.: 16/594,699

(22) Filed: Oct. 7, 2019

(65) Prior Publication Data

US 2020/0065816 A1 Feb. 27, 2020

Related U.S. Application Data

(63) Continuation of application No. 16/112,209, filed on Aug. 24, 2018, now Pat. No. 10,482,466.

(51) Int. Cl.
*G06Q 20/40* (2012.01)
*G06N 3/08* (2023.01)

(52) U.S. Cl.
CPC ........... *G06Q 20/4016* (2013.01); *G06N 3/08* (2013.01)

(58) Field of Classification Search
CPC ................................................ G06Q 20/4016
USPC .......................................................... 705/44
See application file for complete search history.

(56) References Cited

U.S. PATENT DOCUMENTS

| | | | |
|---|---|---|---|
| 9,633,201 B1* | 4/2017 | Katz | G06F 21/552 |
| 2002/0133721 A1* | 9/2002 | Adjaoute | G06Q 20/4016 726/23 |
| 2005/0278192 A1 | 12/2005 | Cantini et al. | |
| 2007/0174164 A1 | 7/2007 | Biffle et al. | |
| 2007/0265935 A1* | 11/2007 | Woycik | G07F 9/002 705/65 |
| 2008/0110978 A1 | 5/2008 | Blume et al. | |
| 2009/0089869 A1 | 4/2009 | Varghese | |
| 2011/0112931 A1 | 5/2011 | Hu et al. | |
| 2013/0024300 A1 | 1/2013 | Choudhuri et al. | |
| 2014/0188730 A1 | 7/2014 | Murgai et al. | |
| 2015/0142713 A1 | 5/2015 | Gopinathan et al. | |
| 2015/0262193 A1 | 9/2015 | Carvalho | |

(Continued)

*Primary Examiner* — Cho Kwong
(74) *Attorney, Agent, or Firm* — KDW Firm PLLC

(57) ABSTRACT

Logic may assign a customer identification to a model to associate a first customer with the model to detect fraudulent transactions. Logic may determine one or more clusters to associate with the first customer based on characteristics associated with the first customer. Logic may associate one or more cluster identifications with the first customer. Each cluster identification may identify one cluster of the one or more clusters. Each cluster may identify a group of customers based on characteristics associated with the group of customers. Logic may cause the model to transmit to a customer device associated with the first customer. Logic may receive transaction data for a transaction for one customer of the group of customers associated with a first cluster. And logic may communicate modified transaction data to customer devices of more than one customer of the group of customers associated with the first cluster.

18 Claims, 7 Drawing Sheets

(56) References Cited

U.S. PATENT DOCUMENTS

| | | |
|---|---|---|
| 2016/0078446 A1 | 3/2016 | Trostle |
| 2016/0132886 A1 | 5/2016 | Burke et al. |
| 2016/0217470 A1 | 7/2016 | Gerard et al. |
| 2016/0269908 A1 | 9/2016 | Richards et al. |
| 2017/0083985 A1 | 3/2017 | Lacoss-Arnold et al. |
| 2017/0085587 A1 | 3/2017 | Turgeman |
| 2017/0339010 A1 | 11/2017 | Gerety et al. |
| 2018/0300631 A1 | 10/2018 | Roy |

* cited by examiner

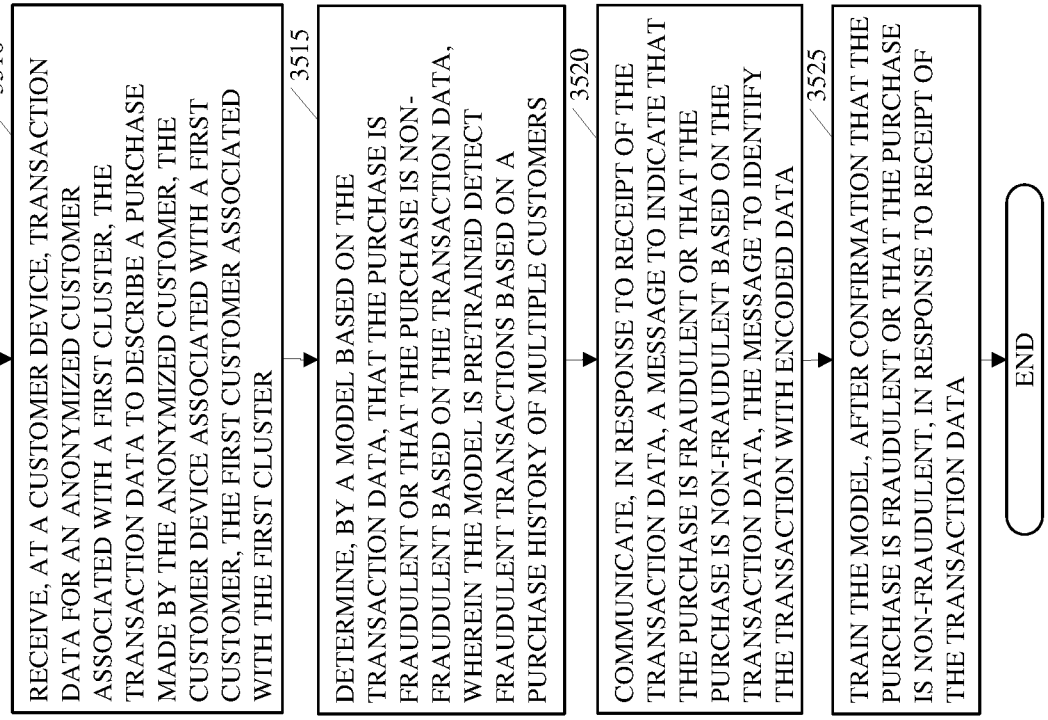
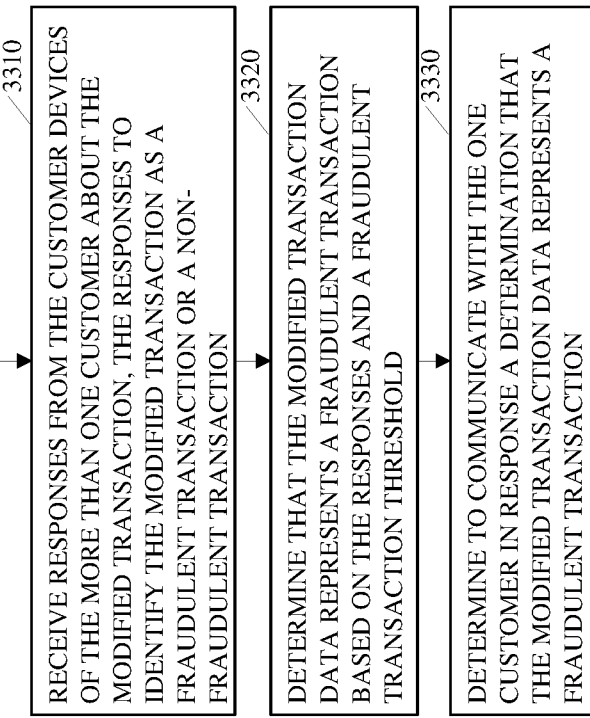
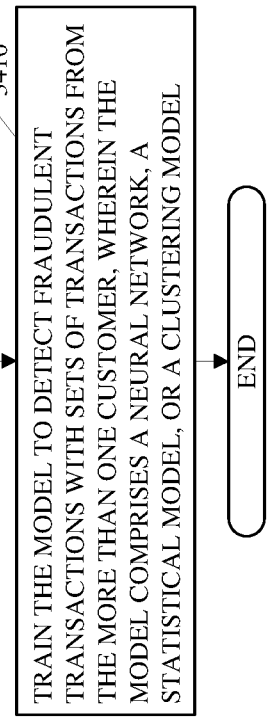

METHODS AND ARRANGEMENTS TO DISTRIBUTE A FRAUD DETECTION MODEL

CROSS-REFERENCE TO RELATED APPLICATIONS

This application is a continuation of U.S. patent application Ser. No. 16/112,209, entitled "METHODS AND ARRANGEMENTS TO DISTRIBUTE A FRAUD DETECTION MODEL" filed on Aug. 24, 2018. The contents of the aforementioned application are incorporated herein by reference in its entirety.

TECHNICAL FIELD

Embodiments described herein are in the field of fraud detection. More particularly, the embodiments relate to methods and arrangements to distribute a fraud detection model for consumer transactions.

BACKGROUND

Although incidences of credit card fraud are limited to about 0.1% of all card transactions, they have resulted in huge financial losses as the fraudulent transactions have been large value transactions. In 1999, out of 12 billion transactions made annually, approximately 10 million—or one out of every 1200 transactions—turned out to be fraudulent. Also, 0.04% (4 out of every 10,000) of all monthly active accounts were fraudulent. Even with tremendous volume and value increase in credit card transactions since then, these proportions have stayed the same or have decreased due to sophisticated fraud detection and prevention systems. Today's fraud detection systems are designed to prevent one-twelfth of one percent of all transactions processed which still translates into billions of dollars in losses.

Typically, models to identify fraud are generated based on behavior across all customers. Fraud models essentially look at black listed locations, points of sales, etc., based on system wide data.

BRIEF DESCRIPTION OF THE DRAWINGS

FIGS. 3A-E depict flowcharts of embodiments for fraud detection logic circuitry, such as the fraud detection logic circuitry shown in FIGS. 1A-1B, 1D-E, and 2;

DETAILED DESCRIPTION OF EMBODIMENTS

Figure 1C:
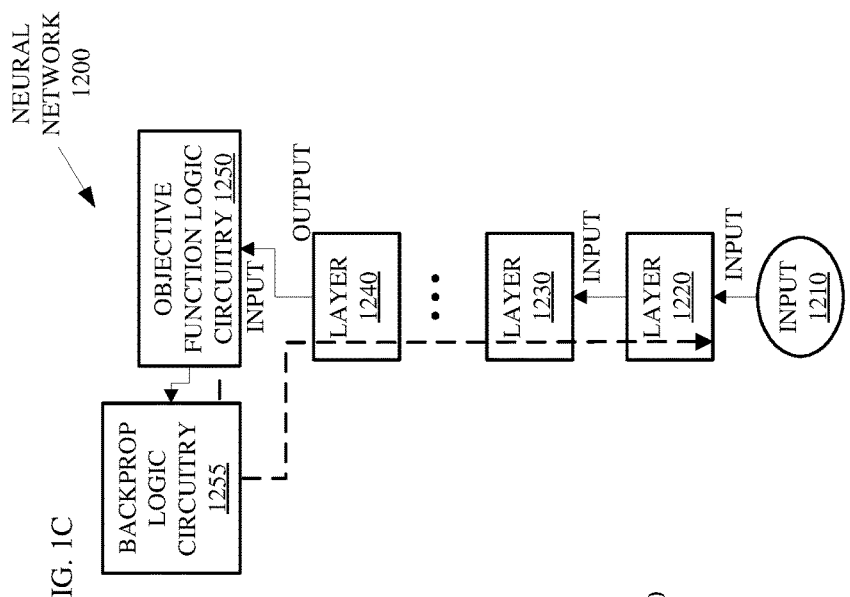
FIG. 1C depicts an embodiment of a neural network of a fraud detection model, such as the fraud detection model illustrated in FIG. 1A.

The following is a detailed description of embodiments depicted in the drawings. The detailed description covers all modifications, equivalents, and alternatives falling within the appended claims.

Contemporary fraud detection models typically blacklist certain types of transactions based on known and expected locations associated with fraud. Embodiments described herein change fundamental concepts of fraud detection by organizing groups of customers to distribute fraud detection. In many embodiments, distribution of fraud detection can involve distribution of computations to one or more groups of customer devices.

Customers may receive an offer to opt-in or otherwise agree to engage in fraud detection services. Based on the responses, a server may implement fraud detection logic circuitry to assign the customers whom agreed to engage in fraud detection services to one or more clusters. A cluster is a group of customers that have at least one characteristic in common. Characteristics may include, e.g., a location, an income level, and/or an aspect of a purchase history such as a previous purchase. For example, a first set of clusters may include customers in particular locations such as zip codes that have an income that falls within one or more different income ranges. As a further example, a second set of clusters may include customers that have an income that falls within one or more different income ranges and have a purchase history that includes periodic purchases of the same types of goods or services.

Embodiments may pretrain a fraud detection model based on multiple customer purchase histories to detect non-fraudulent transactions, detect fraudulent transactions, and/or to classify transactions as fraudulent or non-fraudulent. The fraud detection model may comprise a statistical model, a classification model, and/or a neural network.

Many embodiments pretrain the fraud detection model with multiple sets of transactions. In several embodiments, the fraud detection model is initially pretrained with transactions from multiple customers to train the fraud detection model about common features of non-fraudulent transactions. Some embodiments select transactions from the multiple customers to train the fraud detection model, advantageously increasing the robustness of the fraud detection model's ability to recognize non-fraudulent transactions. Some embodiments randomly select non-fraudulent transactions to generate the training data. And some embodiments introduce fuzziness to the values such as transaction values, geo-location values, time values, other factors implemented as inputs for the fraud detection model, and the like, to increase the robustness of the training for the fraud detection model.

After pretraining the fraud detection model, embodiments may assign an instance of the fraud detection model to each of the customers whom agreed to engage in fraud detection services. In some embodiments, the fraud detection logic circuitry distributes these instances of the fraud detection model to customer devices associated with each of the customers. For instance, the fraud detection logic circuitry may distribute the fraud detection models to a customers' smart phone, tablet, laptop, and/or other computer in the form of a software application.

After assigning one or more clusters to a customer and assigning a fraud detection model to the customer, the customer is ready to participate in the fraud detection services. Assignment of the one or more clusters to the customer associates the one or more clusters with the model assigned to the customer. Transactions conducted by a customer whom is a member of a cluster are provided to multiple fraud detection models associated with the cluster so the fraud detection models can vote on a classification of the transaction as a non-fraudulent transaction or a fraudulent transaction. For situations in which the customer is a member of more than one cluster, the fraud detection logic circuitry on a server can distribute the transaction to fraud detection models associated with one or more of those clusters. For example, the fraud detection logic circuitry may determine or include a preference or other setting that instructs the fraud detection logic circuitry to distribute transactions to, e.g., 1000 fraud detection models, 5% of a typical or average cluster membership, or the like. Based on the preference or other setting, the fraud detection logic circuitry may distribute the transaction to one or more of or all the clusters associated with the customer that conducted the transaction. In some embodiments, the fraud detection logic circuitry distributes the transaction evenly amongst the one or more of or all the clusters. The fraud detection logic circuitry may also implement a fairness routine to evenly distribute transactions over time to the clusters such as a round robin routine or the like.

In several embodiments, the fraud detection logic circuitry may obscure at least a portion of the transaction data of the transactions prior to distributing transactions to fraud detections models. For instance, the fraud detection logic circuitry may hash or encrypt a customer identifier associated with a transaction to generate modified transaction data. The fraud detection logic circuitry may then distribute the modified transaction data to the fraud detection models.

Once a fraud detection model receives a transaction in the form of, e.g., modified transaction data, the fraud detection model may compute a vote based on pretraining of the fraud detection model and, in many embodiments, ongoing training of the fraud detection model (e.g. based on transaction data received by a customer device). The vote may indicate a binary classification of the transaction as fraudulent or non-fraudulent, or may indicate a number that represents, e.g., a likelihood that the transaction is fraudulent or non-fraudulent, or an error or deviation calculated by the fraud detection model that indicates a deviation from a transaction that the fraud detection model considers to be fraudulent or non-fraudulent.

For embodiments in which the fraud detection models reside on customer devices, the fraud detection logic circuitry of the customer device may transmit the vote along with an obscured customer identification and/or a transaction identification included in the modified transaction data to identify the transaction for which the vote was computed. The fraud detection logic circuitry on a server may receive the votes from multiple fraud detection models, associate the votes with the transaction, and determine, based on the votes received, whether the transaction is non-fraudulent or if the customer associated with the transaction should be notified and requested to confirm the transaction as being non-fraudulent or fraudulent. For example, if the fraud detection logic circuitry transmits the modified transaction to one thousand fraud detection models that reside on customer devices, there is a probability that one or more of the customer devices are unavailable to vote. Thus, the fraud detection logic circuitry may transmit the modified transaction data to 1000 fraud detection models in an attempt to obtain a vote from at least, e.g., 600 or 800 of the fraud detection models.

In many embodiments, the fraud detection logic circuitry may have set goals or thresholds that remain constant for every voting process or that may vary based on other factors. For example, the fraud detection logic circuitry may close the voting process once the fraud detection logic circuitry reaches a fraudulent transaction threshold of receipt of the 600 or 800 votes. In further embodiments, the fraud detection logic circuitry has a time threshold and may wait to receive as many votes as possible within the period of time associated with the time threshold such as 5 minutes or 2 minutes. In several embodiments, the fraud detection logic circuitry may implement a combination of more than one threshold. For instance, the fraud detection logic circuitry may terminate the voting process upon receipt of 600 votes but may end the voting process after 2 minutes if the fraud detection logic circuitry received at least 300 votes, at least 30 votes that indicate that the transaction is fraudulent, at least 400 votes that indicate that the transaction is non-fraudulent, or the like, within that 2 minutes.

After the closing the voting process, the fraud detection logic circuitry of the server may finish an evaluation of the votes to determine whether to classify the transaction as non-fraudulent or as fraudulent. If the transaction is classified as non-fraudulent, the process may end and the fraud detection logic circuitry of the server may wait for another transaction to occur.

On the other hand, if the transaction is classified as fraudulent or potentially fraudulent, the fraud detection logic circuitry of the server may contact the customer to request verification or confirmation as to whether the transaction is non-fraudulent or fraudulent. If the customer responds with an indication that the charge is non-fraudulent, in many embodiments, the process ends and the fraud detection logic circuitry of the server may wait for another transaction to occur.

If the customer responds with an indication that the transaction is fraudulent, the fraud detection logic circuitry of the server may respond accordingly and may transmit training for every fraud detection model associated with the cluster(s) that the transaction is fraudulent. In other embodiments, the fraud detection logic circuitry of the server may send out the fraudulent transaction along with an indication that the transaction is fraudulent to less than all the fraud detection models associated with the cluster(s). Training all the fraud detection models based on the fraudulent transaction may advantageously bias the models with training to detect fraudulent transactions.

Note that logic circuitry refers to circuitry that implements logic with discrete components and/or integrated circuits; processing circuitry that has processing capabilities to perform logic at least partially in the form of code along with the code; circuitry with buffers, other storage media, and/or other storage capabilities to store code along with the code; and/or a combination thereof. Note also that the logic circuitry may be referred to as a functional block. A functional block includes circuitry to perform a function. The circuitry may include one or more circuits, each circuit configured to perform a portion of a function, and may include processing circuitry that is configured to execute code such as software, firmware, microcode, and/or other types of instructions. A functional block may also include circuitry to store instructions and data for use by the processing circuitry.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

Figure 1A:
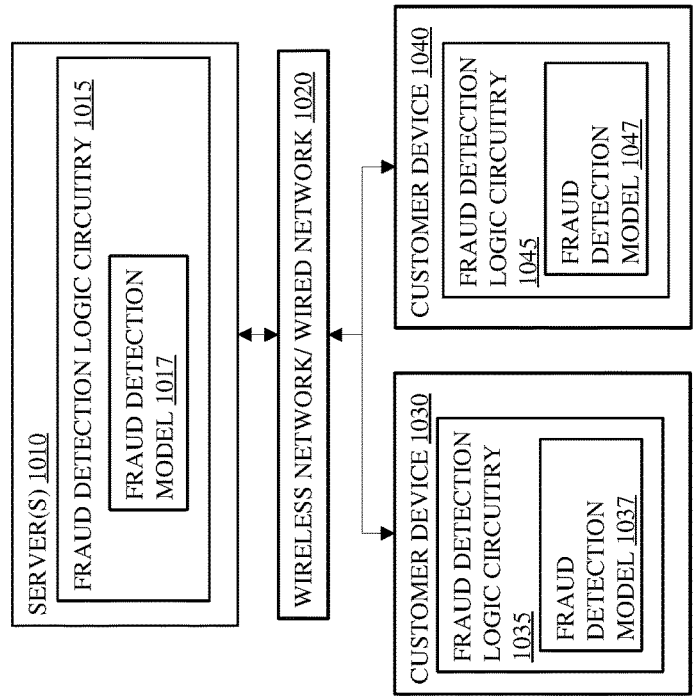
FIG. 1A depicts an embodiment of a system including one or more servers, networks, and customer devices to detect fraudulent transactions.

Turning now to the drawings, FIG. 1A depicts an embodiment of a system 1000 including one or more server(s) 1010, a network, and customer devices 1030 and 1040 to detect fraudulent transactions. The system 1000 may represent a portion of at least one wireless or wired network 1020 that interconnects server(s) 1010 with customer devices 1030 and 1040. The at least one wireless or wired network 1020 may represent any type of network or communications medium that can interconnect the server(s) 1010 and the customer devices 1030 and 1040, such as a cellular service, a cellular data service, satellite service, other wireless communication networks, fiber optic services, other land-based services, and/or the like, along with supporting equipment such as hubs, routers, switches, amplifiers, and/or the like.

The customer devices 1030 and 1040 may comprise, e.g., smart phones owned by a first customer and a second customer, respectively. In the present embodiment, the first and second customers opted-in or otherwise agreed to participate in the fraud detection services in which the customer devices 1030 and 1040 receive and maintain fraud detection models, 1037 and 1047. The fraud detection models, 1037 and 1047 receive transactions and vote on whether the transaction is fraudulent or non-fraudulent. While such embodiments may request only insignificant amounts of processing capacity and power consumption from individual customer devices, such embodiments advantageously leverage processing capabilities of possibly millions of customer devices for parallel processing by a robust network of fraud detection models.

Note that the system 1000 only illustrates two customer devices 1030 and 1040 for the purposes of discussion but embodiments can have hundreds, thousands, tens of thousands, millions, or even tens of millions of customer devices.

In the present embodiment, the server(s) 1010 may represent one or more servers owned and/or operated by one or more companies that provide services related to the fraud detection services. In some embodiments, the server(s) 1010 represent more than one company that provides services. For example, a first set of one or more server(s) 1010 may provide services including pretraining a fraud detection model 1017 of a fraud detection logic circuitry 1015 with transaction data from more than one customer. The first set of server(s) 1010 may comprise anonymized transaction data. In some embodiments, the transaction data is not anonymized.

The first set of server(s) 1010 may pretrain the fraud detection model 1017 to detect, classify, and/or predict non-fraudulent and/or fraudulent transactions by training the fraud detection model 1017 with sets of transactions from multiple customers. In several embodiments, the fraud detection model 1017 comprises a neural network, a statistical model, and/or a clustering model. For instance, the server(s) 1010 may pretrain multiple types of models including a neural network, a statistical model, and a clustering model for fraud detection or may train a single type of fraud detection model such as a neural network, a statistical model, or a clustering model. For embodiments that implement multiple types of models, different types of models may by assigned to different customers or clusters, or combinations of two or more types of models may be assigned to the same customers or clusters.

After pretraining the fraud detection model 1017 with the transaction data from multiple customers, in the present embodiment, the fraud detection logic circuitry 1015 may transfer, or cause to be transferred, instances of the fraud detection model 1017, which include the fraud detection models 1037 and 1047, to customer devices such as the customer devices 1030 and 1040. In other embodiments, the server(s) 1010 may maintain the fraud detection models 1037 and 1047 on behalf of the customers associated with the customer devices 1030 and 1040.

In many embodiments, the fraud detection logic circuitry 1015 assigns a customer identification to each of the fraud detection models 1037 and 1047. For instance, the fraud detection logic circuitry 1015 may assign the customer identification of the first customer to the fraud detection model 1037 and the customer identification of the second customer to the fraud detection model 1047. In other embodiments, the fraud detection models 1037 and 1047 have model identifications such as serial numbers and the server(s) 1010 maintain an association between the model identifications and the customer identifications.

The fraud detection logic circuitry 1015 may also assign the first customer and the second customer to one or more clusters. Clusters are groups of customers that participate in the fraud detection service that share one or more characteristics. The characteristics may relate to information a customer's profile, or information otherwise associated with the customer such an annual income or household income, a residential location or business location, and/or one or more aspects of a purchase history such as types of previous purchases. An association of a customer with a cluster also associates the fraud detection model with that cluster. Thus, if the first customer is associated with a first cluster and a second cluster, the fraud detection model 1037 is also associated with both the first cluster and the second cluster.

Furthermore, the fraud detection logic circuitry 1015 transmits transactions conducted by customers associated with a cluster to fraud detection models of customers that are members of that cluster. For instance, if both the first customer and the second customer are members of a first cluster, when the fraud detection logic circuitry 1015 receives a transaction conducted by the first customer, the fraud detection logic circuitry 1015 may transmit transaction data about the transaction to the fraud detection model 1047 of the customer device 1040.

Figure 1B:
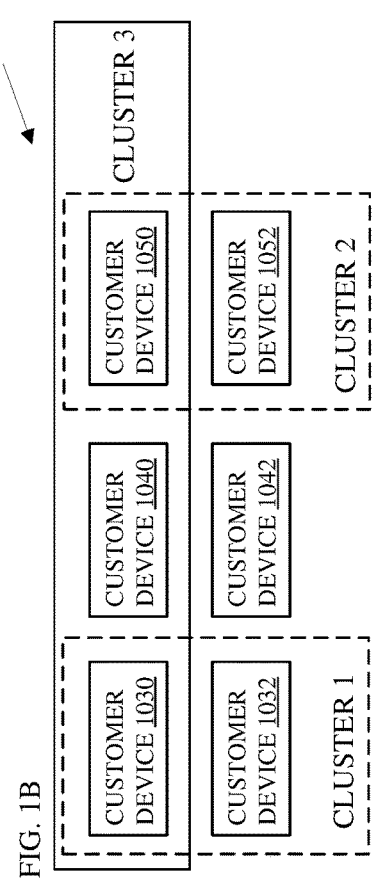
FIG. 1B depicts an embodiment of clustering of customer devices to detect fraudulent transactions.

Referring now to FIGS. 1A-B, FIG. 1B depicts an embodiment 1100 of clustering of customer devices to detect fraudulent transactions such as the customer devices shown in FIG. 1A. In particular, the embodiment 1100 illustrates how clusters can overlap, allowing customers to be members of more than one cluster. Cluster 1 includes the customer devices 1030 and 1032; cluster 2 includes customer devices 1050 and 1052; and cluster 3 includes customer devices 1030, 1040, and 1050. The customer device 1042 is not a member of clusters 1, 2, or 3, possibly because the customer associated with the customer device 1042 did not agree to participate.

From a fraud detection perspective, the fraud detection logic circuitry 1015 identifies transactions conducted by customers associated with cluster 1 and distributes transaction data that describes the transaction to customer devices associated with cluster 1 such as the customer devices 1030 and 1032. The fraud detection model 1037 of the customer device 1030 may perform computations based on the transaction data and output a vote that may be in the form of a binary answer that the transaction is fraudulent or non-fraudulent. In other embodiments, the vote may comprise a number indicative of an error associated with the transaction data to indicate that the transaction is fraudulent or non-fraudulent. The fraud detection model of the customer device 1032 may also perform computations based on the transaction data and vote that the transaction is fraudulent or non-fraudulent.

The customer devices 1030 and 1032 may transmit their votes to the fraud detection logic circuitry 1015 and the fraud detection logic circuitry 1015 may determine, based on the votes, whether to contact the customer associated with the transaction to confirm whether the transaction is fraudulent. In some embodiments, the fraud detection logic circuitry 1015 may include a setting or preference, or a heuristic algorithm to determine whether a count or portion of the votes indicating that the transaction is fraudulent, raises a sufficient question about fraud to contact the customer to confirm that the transaction is fraudulent or non-fraudulent. Note that while the embodiment 1100 shows two or three customer devices in each of the clusters, many embodiments may include significantly more customer devices in each cluster.

With respect to training, fraud detection models such as the fraud detection models 1037 and 1047 may train based on transactions for which the fraud detection models 1037 and 1047 compute a vote. In particular, the fraud detection models 1037 and 1047 may continue to train while providing fraud detection services. For example, in response to receipt of transaction data for a first transaction, the fraud detection model 1037 may compute a vote to classify the transaction as non-fraudulent. Thereafter, if the fraud detection logic circuitry 1030 does not receive an indication that the transaction is fraudulent from the fraud detection logic circuitry 1015, the fraud detection logic circuitry 1030 may assume that the transaction was non-fraudulent and train the fraud detection model 1037 based on the transaction being non-fraudulent.

As another example, in response to receipt of a transaction data for a second transaction, the fraud detection model 1037 may compute a vote to classify a second transaction as fraudulent. Thereafter, if the fraud detection logic circuitry 1030 does not receive an indication that the transaction is fraudulent from the fraud detection logic circuitry 1015, the fraud detection logic circuitry 1030 may assume that the transaction was non-fraudulent and train based on the second transaction. In other embodiments, the fraud detection logic circuitry 1015 may confirm that the transaction is non-fraudulent and/or fraudulent prior to the fraud detection model 1037 training based on the first or second transaction.

For potentially fraudulent transactions, the fraud detection logic circuitry 1015 may generate a notification including transaction data indicative of the purchase such as the location of the purchase, the value of the purchase, the type of purchase, the vendor with whom the purchase was transacted, and/or the like. The notification may request that customer confirm the purchase was non-fraudulent or that the purchase was fraudulent.

In many embodiments, if the fraud detection logic circuitry 1015 determines that a transaction is fraudulent and/or confirms that the transaction is fraudulent based on a confirmation from the customer, the fraud detection logic circuitry 1015 may transmit the transaction data for the fraudulent transaction along with an indication that the transaction is fraudulent. Upon receipt of the transaction data for the fraudulent transaction along with an indication that the transaction is fraudulent, the fraud detection model 1037 may train with the transaction data with knowledge that the correct vote is a vote that the transaction is fraudulent.

Note also that, for the purposes of training, fraud detection models associated with different clusters, receive different, continued training. In other words, the fraud detection models for different customers are trained differently based on characteristics of the customers that determine the customers' association with cluster(s). In many embodiments, a model will only train with transaction data received by that model for fraud detection purposes. In several embodiments, a model within a cluster will only receive a portion or fraction of the transactions conducted by customers that are members of that cluster. Such continued training or retraining can advantageously produce models with a variety of different training experiences and, thus, add robustness to fraud detection. For example, the customer device 1030 may receive and train based on transactions associated with cluster 1 and cluster 3. In some instantiations, the customer device 1030 may receive and train with all transactions conducted by customers associated with clusters 1 and 3, and, in other instantiations, the customer device 1030 may receive and train based on a percentage of the transactions associated with cluster 1 and a percentage of the transactions associated with cluster 3. Similarly, the customer device 1032 may receive and train based on transactions associated with cluster 1, the customer device 1040 may receive and train based on transactions associated with cluster 3, and the customer device 1050 may receive and train based on transactions associated with cluster 2 and cluster 3. And, the customer device 1052 may receive and train based on transactions associated with cluster 2. Furthermore, if the models detect fraud in a transaction and the fraud detection logic circuitry 1015 of the server(s) 1010 confirm that that the transaction is fraudulent, the fraud detection logic circuitry 1015 of the server(s) 1010 may transmit the transaction data of the fraudulent transaction to some or all the fraud detection models in the cluster associated with the fraudulent transaction. Training various models based on different sets of transactions adds variety to the training and, advantageously, adds robustness to fraud detection based on the models.

FIG. 1C depicts an embodiment a neural network (NN) 1200, such as a convolutional neural network (CNN) or a recurrent neural network (RNN), to operate as a fraud detection model such as the fraud detection models 1017, 1037, and 1047 shown in FIG. 1A. In one embodiment, for instance, the fraud detection models that comprise RNNs may train on a series of transactions such as a time series to learn to predict the next item in a series or generate a probability of an event occurring. In such embodiments, the fraud detection models may detect fraud by detection of transaction data that is outside a predicted set of transactions or outside the probability that such as transaction would occur.

The neural network 1200 comprises an input layer 1210, and three or more layers 1220 and 1230 through 1240. The input layer 1210 may comprise input data that is training data for the neural network 1200 or new transaction data to evaluate to determine if the new transaction is fraudulent or non-fraudulent. The input layer 1210 may provide the transaction data in the form of tensor data to the layer 1220. The transaction data may comprise transaction information, which is data related to a purchase by a customer. The transaction data may include location information, value information, transaction type information, time information, and/or the like. For instance, the location information may include coordinates, a distance from an address associated with a customer, an address, a city, a state, a zip code, a map quadrant, and/or the like. The value information may include a purchase price, a value on hold, a sub-total, a tax, and/or the like. The transaction type information may include an indication of a general type of purchase such as a retail purchase, a travel purchase, a meals and entertainment purchase, a vehicle maintenance purchase, a tax, a government fee, and/or the like. The transaction type information may also include an indication of a subtype of purchase such as a computer equipment or accessory purchase, a gas purchase, a sports equipment and accessory purchase, and/or the like. And the time information may include a time, a day, a month, a year, a season, a quarter, and/or the like.

In many embodiments, the input layer 1210 is not modified by backpropagation. The layer 1220 may compute an output and pass the output to the layer 1230. Layer 1230 may determine an output based on the input from layer 1220 and pass the output to the next layer and so on until the layer 1240 receives the output of the second to last layer in the neural network 1200.

The layer 1240 may generate an output and pass the output to an objective function logic circuitry 1250. The objective function logic circuitry 1250 may determine errors in the output from the layer 1240 based on an objective function such as a comparison of the expected output against the actual output. For instance, the expected output may be paired with the input in the training data supplied for the neural network 1200 for supervised training. In the present embodiment, during training, the output of the objective function logic circuitry 1250 should be less than a deviation threshold if the training data is known to represent non-fraudulent transactions and greater than or equal to the deviation threshold if the training data is known to represent fraudulent transactions.

When operating in inference mode, the fraud detection logic circuitry, such as the fraud detection logic circuitry 1015 shown in FIG. 1A, may compare the output of the objective function logic circuitry 1250 against the deviation threshold to determine if the error indicates a potentially fraudulent transaction or a non-fraudulent transaction.

During the training mode, the objective function logic circuitry 1250 may output errors to backpropagation logic circuitry 1255 to backpropagate the errors through the neural network 1200. For instance, the objective function logic circuitry 1250 may output the errors in the form of a gradient of the objective function with respect to the parameters of the neural network 1200.

The backpropagation logic circuitry 1255 may propagate the gradient of the objective function from the top-most layer, layer 1240, to the bottom-most layer, layer 1220 using the chain rule. The chain rule is a formula for computing the derivative of the composition of two or more functions. That is, if f and g are functions, then the chain rule expresses the derivative of their composition f ° g (the function which maps x to f(g(x))) in terms of the derivatives of f and g. After the objective function logic circuitry 1250 computes the errors, backpropagation logic circuitry 1255 backpropagates the errors. The backpropagation is illustrated with the dashed arrows.

Figure 1E:
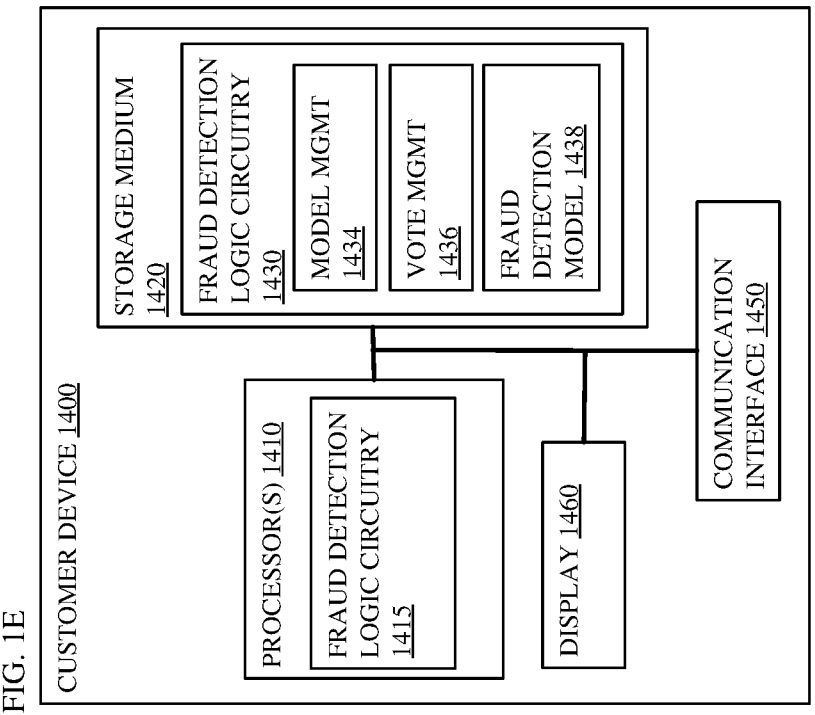
FIG. 1D-E depict embodiments of a server and a customer device to detect fraudulent transactions.
Figure 1D:
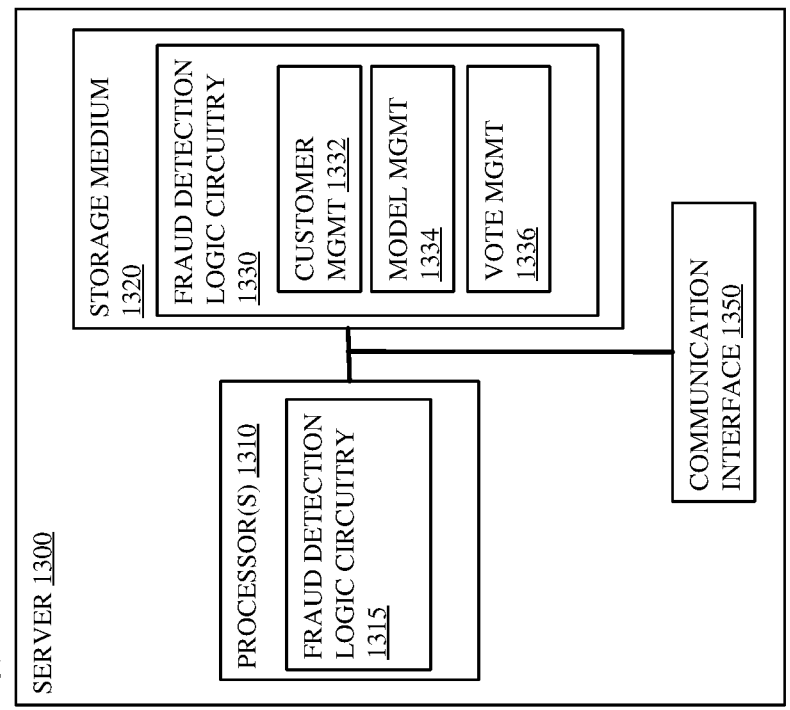

FIG. 1D depicts an embodiment for a server 1300 such as one of the server(s) 1010 shown in FIG. 1A. The server 1300 may be a computer in the form of, e.g., a smart phone, a tablet, a notebook, a desktop computer, a workstation, or a business-class or enterprise-class server. The server 1300 can combine with any suitable embodiment of the systems, devices, and methods disclosed herein. The server 1300 can include processor(s) 1310, a non-transitory storage medium 1320, and communication interface 1350. The processor(s) 1310 may comprise one or more processors, such as a programmable processor (e.g., a central processing unit (CPU)). The processor(s) 1310 may comprise processing circuitry to implement fraud detection logic circuitry 1315 such as the fraud detection logic circuitry 1015 in FIG. 1A.

The processor(s) 1310 may operatively couple with a non-transitory storage medium 1320. The non-transitory storage medium 1320 may store logic, code, and/or program instructions executable by the processor(s) 1310 for performing functionality including functionality of the fraud detection logic circuitry 1330. The non-transitory storage medium 1320 may comprise one or more memory units (e.g., removable media or external storage such as a secure digital (SD) card, random-access memory (RAM), a flash drive, a hard drive, and/or the like). The memory units of the non-transitory storage medium 1320 can store logic, code and/or program instructions executable by the processor(s) 1310 to perform any suitable embodiment of the methods described herein. For example, the processor(s) 1310 may execute instructions such as instructions of fraud detection logic circuitry 1330 causing one or more processors of the processor(s) 1310 represented by the fraud detection logic circuitry 1315 to pretrain a fraud detection model such as the fraud detection model 1017 shown in FIG. 1A.

The non-transitory storage medium 1320 may comprise customer management 1332, model management 1334, and vote management 1336. The customer management 1332 may comprise code, which, when executed by the processor(s) 1310, cause the processor(s) 1310 to assign a customer identification to a fraud detection model to associate the model with a customer and to determine one or more clusters to associate with the customer based on characteristics associated with the customer. The customer management 1332 may also associate one or more cluster identifications with the customer. The cluster identifications may identify clusters with which the customer is associated.

The model management 1334 may comprise code, which, when executed by the processor(s) 1310, cause the processor(s) 1310 to pretrain a fraud detection model with transaction data from multiple customers. The pretraining may provide the fraud detection model with an ability to converge on a solution, e.g., fraudulent or non-fraudulent, or an ability to converge on a solution within an acceptable margin of error, when presented with transaction data at an input of the fraud detection model.

The vote management 1336 may comprise code, which, when executed by the processor(s) 1310, cause the processor(s) 1310 to identify one or more clusters associated with a new transaction and generate a vote request for more than one of the fraud detection models associated with the one or more clusters. The vote management 1336 may further cause the processor(s) 1310 to receive a vote, identify the vote as being associated with the new transaction, and evaluate the votes associated with the new transaction to determine if the votes indicate that the new transaction is fraudulent.

The processor(s) 1310 may couple to a communication interface 1350 to transmit data to and/or receive data from one or more external devices (e.g., a terminal, display device, a smart phone, a tablet, a server, or other remote device). The communication interface 1350 includes circuitry to transmit and receive communications through a wired and/or wireless media such as an Ethernet interface, a wireless fidelity (Wi-Fi) interface, a cellular data interface, and/or the like. In some embodiments, the communication interface 1350 may implement logic such as code in a baseband processor to interact with a physical layer device to transmit and receive wireless communications such as transmitting a vote request to and/or receiving a vote from fraud detection logic circuitry of a customer device. For example, the communication interface 1350 may implement one or more of local area networks (LAN), wide area networks (WAN), infrared, radio, Wi-Fi, point-to-point (P2P) networks, telecommunication networks, cloud communication, and the like.

FIG. 1E depicts an embodiment for a customer device 1400 such as one of the customer devices 1030 and 1040 shown in FIG. 1A. The customer device 1400 may be a computer in the form of, e.g., a smart phone, a tablet, a notebook, a desktop computer, a workstation, or a business-class or enterprise-class server. The customer device 1400 can combine with any suitable embodiment of the systems, devices, and methods disclosed herein. The customer device 1400 can include processor(s) 1410, a non-transitory storage medium 1420, communication interface 1450, and a display 1460. The processor(s) 1410 may comprise one or more processors, such as a programmable processor (e.g., a central processing unit (CPU)). The processor(s) 1410 may comprise processing circuitry to implement fraud detection logic circuitry 1415 such as the fraud detection logic circuitry 1035 or 1045 in FIG. 1A.

The processor(s) 1410 may operatively couple with a non-transitory storage medium 1420. The non-transitory storage medium 1420 may store logic, code, and/or program instructions executable by the processor(s) 1410 for performing one or more instructions including instructions for the fraud detection logic circuitry 1430. The non-transitory storage medium 1420 may comprise one or more memory units such as the non-transitory storage medium 1320 in FIG. 1D.

The model management 1434 may comprise code, which, when executed by the processor(s) 1410, cause the processor(s) 1410 to continue the training of the fraud detection model 1438 with new transaction data. The new transaction data may include transaction data transmitted as part of a vote request from a fraud detection logic circuitry of a server such as the fraud detection logic circuitry 1015 of the server(s) 1010 in FIG. 1A or the fraud detection logic circuitry 1315 of the server 1300 in FIG. 1D. The vote request may request that the fraud detection model 1438 evaluate transaction data and respond with an indication about whether the new transaction is fraudulent or non-fraudulent.

The vote management 1436 may comprise code, which, when executed by the processor(s) 1410, cause the processor(s) 1410 to receive a vote request from a fraud detection logic circuitry of a server such as the fraud detection logic circuitry 1015 of the server(s) 1010 in FIG. 1A or the fraud detection logic circuitry 1315 of the server 1300 in FIG. 1D. The vote management 1436 may further cause the processor(s) 1410 to receive the output from the fraud detection model 1438 and communicate the vote to the fraud detection logic circuitry of a server.

The fraud detection model 1438 may comprise code, which, when executed by the processor(s) 1410, cause the processor(s) 1410 to compute a vote in response to receipt of transaction data to indicate if the transaction data represents a fraudulent transaction or a non-fraudulent transaction.

The processor(s) 1410 may couple to a communication interface 1450, such as the communication interface 1350 in FIG. 1D, to transmit and/or receive data from one or more external devices (e.g., a terminal, display device, a smart phone, a tablet, a server, or other remote device). The processor(s) 1410 may also couple to a display 1460 to display, e.g., a message to a customer using the customer device 1400. For instance, the customer device 1400 may receive a message from the fraud detection logic circuitry of a server that requests confirmation that a transaction is fraudulent or non-fraudulent and display the message on the display 1460. In many embodiments, the message may also display links such as a link to indicate that the transaction is fraudulent and a link to indicate that the transaction is non-fraudulent.

Figure 2:
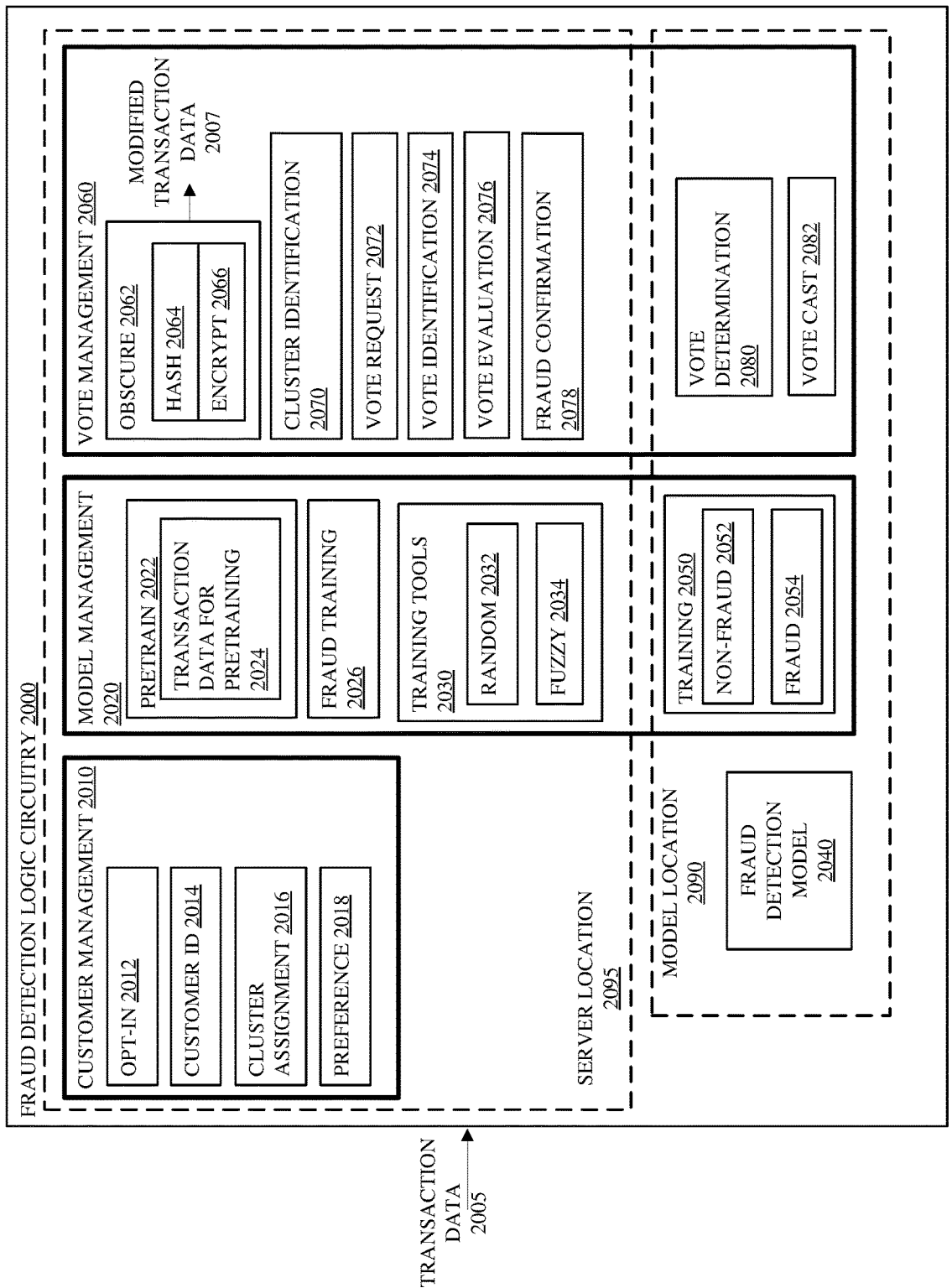
FIG. 2 depicts an embodiment of fraud detection logic circuitry, such as the fraud detection logic circuitry shown in FIGS. 1A-1B and 1D-E.

FIG. 2 depicts an embodiment of a fraud detection logic circuitry 2000 such as the fraud detection logic circuitry 1015 and 1035 in FIG. 1A. The fraud detection logic circuitry 2000 includes functionality to establish a distributed system for fraud detection. Some the functionality of the fraud detection logic circuitry 2000 can be distributed to more than one server and/or more than one customer device. The server location 2095 is one example of functionality that can be located in one or more servers while the model location 2090 is one example of functionality that can be located in customer devices such as the customer's smart phone. Such functionality resides at the location of each instance of the fraud detection model 2040. For example, if a cluster includes two thousand customers, each of the two thousand customers in the cluster comprise the logic circuitry described in the model location 2090. In other embodiments, all the functionality described in the fraud detection logic circuitry 2000 can reside in one server. In still other embodiments, all the functionality in the fraud detection logic circuitry 2000 may reside in customer devices. In the latter embodiments, additional functionality related to obscuring customer information may reside in the servers and the translation of obscured customer information such as the customer identification may reside in one or more servers to increase protection of private information.

The fraud detection logic circuitry 2000 may perform one or more operations to establish and implement a fraud detection service. The fraud detection logic circuitry 2000 may include logic circuitry comprising customer management 2010, model management 2020, vote management 2060, and a fraud detection model 2040.

The customer management 2010 may manage a customer that opts-in or otherwise agrees to participate in the fraud detection service. The customer management 2010 may comprise an opt-in 2012 logic circuitry to request and receive approval from a customer to include the customer in the fraud detection services. In response to a positive response from the customer to agree to participate in the fraud detection service, the customer identification (ID) 2014 logic circuitry may assign a customer ID associated with the customer to a fraud detection model 2040. In many embodiments, assignment of the customer ID to a model involves copying the fraud detection model 2040 to create an instance of the fraud detection model 2040 or transmitting a copy of the fraud detection model 2040 to the model location 2090.

The cluster assignment 2016 logic circuitry may assign or associate the customer with one or more clusters. A cluster is a group of customers that share at least one characteristic. The characteristics may include, for example, a geographical area, an income level, or one or more aspects or previous purchases of a purchase history. For instance, the customers in a first cluster may all reside within the same geographical area such as zip code, a set of zip codes, a city, a state, a section of a map, and/or the like. The customers in a second cluster may have an income level that falls within a particular income range. The customers in a third cluster may regularly or periodically purchase disc golf equipment and pay for other disc golf related services. And the customers in a fourth cluster may repeatedly purchase computer equipment and other related electronics and items. In further embodiments one or more or all the clusters may include customers with two or more characteristics in common.

In many embodiments, the cluster assignment 2016 logic circuitry may compare characteristics associated with one or more of the clusters against the customer profile for the customer. If the characteristic(s) associated with a first cluster match characteristics of the customer, the cluster assignment 2016 logic circuitry may associate the customer with the cluster by, e.g., adding a cluster identification for the first cluster to the customer's profile or associating the cluster identification with the customer's profile. In some embodiments, the cluster assignment 2016 logic circuitry may compare the characteristics of each cluster against the customer's profile to determine if the characteristics of the customer match the cluster. In other embodiments, the cluster assignment 2016 logic circuitry may compare the characteristics of each cluster against the customer's profile until the customer is associated with a maximum number of clusters such as two clusters or four clusters. In one embodiment, the cluster assignment 2016 logic circuitry may compare the characteristics of a selected group of clusters against the customer's profile to determine whether to associate the customer with one or more of the clusters. For example, the cluster assignment 2016 logic circuitry may select the group of clusters based on low membership in the clusters or because the clusters are relatively new clusters that have not reached full membership.

The preference 2018 logic circuitry may gather and store preferences of the customer in relation to the fraud detection services. For instance, as part of the cluster, transaction data 2005 descriptive of transaction conducted by the customer is transmitted to other customers in the cluster that vote on whether the transaction data 2005 represents a fraudulent transaction or a non-fraudulent transaction. Due to associations with different sets of clusters, the fraud detection model 2040 of each customer may have different training and, in many situations, may vote differently. So, one preference that a customer may provide is a measure of the customer's fraud tolerance.

The customer may provide a measure of fraud tolerance by selecting an indicator that describes that customer's fraud tolerance, selecting a number between, e.g., 1 and 5, and/or the like. The preference may determine or be a factor in a determination of conditions for which the customer receives a request to confirm whether a transaction is fraudulent. For instance, the vote evaluation 2076 logic circuitry of the vote management 2060 may compare the number or count, or portion of votes that indicate that a transaction is fraudulent against a vote threshold to determine if the vote count indicates that the customer should be contacted to verify that the transaction is fraudulent. The preference may adjust that vote threshold.

The model management 2020 may include functionality to pretrain and train the fraud detection model 2040. The model management 2020 may comprise logic circuitry including pretrain 2022, fraud training 2026, and training tools 2030. The pretrain 2022 logic circuitry may randomly select transactions from multiple customers or all customers to provide supervised or unsupervised training for the fraud detection model 2040, depending on the type of model. In some embodiments, the pretrain 2022 logic circuitry may anonymize at least a portion of the transaction data via encryption or other means. The anonymized transaction data may include transaction data that does not have data to identify a customer and may even have modified data that does not accurately represent the transactions by the customer but reflects the transactions closely enough for training. In several embodiments, the pretrain 2022 logic circuitry receives and stores transaction data for pretraining 2024. In some embodiments, the transaction data for pretraining 2024 includes transaction data that is anonymized and/or modified.

In many embodiments, the pretrain 2022 logic circuitry may pretrain the fraud detection model 2040 with supervised training for both non-fraudulent transactions and fraudulent transactions. In some embodiments, the pretrain 2022 logic circuitry may bias training towards fraudulent transactions by oversampling fraudulent transactions. In other embodiments, the pretrain 2022 logic circuitry may only pretrain the fraud detection model 2040 with non-fraudulent transactions or with fraudulent transactions.

The fraud training 2026 logic circuitry may train the fraud detection model 2040 based on new transactions that are fraudulent. For instance, the vote evaluation 2076 logic circuitry determines that a transaction is fraudulent based on the votes received from multiple fraud detection models, the fraud training 2026 logic circuitry may train all fraud detection models associated with the cluster, within which the fraudulent transaction occurred, with the fraudulent transaction. The fraud training 2026 logic circuitry may transmit an indication such as a bit in the message of the transaction to indicate that the transaction is a fraudulent transaction so that the fraud detection model 2040 trains with supervision.

The training tools 2030 logic circuitry may adjust training data to pretrain the fraud detection model 2040 via the pretrain 2022 logic circuitry. The training tools 2030 may repeatedly select sets of transaction data from the multiple customer's purchase history for training. Each set may include randomly selected customer transaction data to, advantageously, increase the robustness of the training.

The training tools 2030 comprise logic circuitry to improve the training by occasionally or periodically modifying the transaction data for the pretrain 2022 logic circuitry. In the present embodiment, the training tools 2030 comprises random 2032 and fuzzy 2034. The random 2032 logic circuitry may form random sets of transactions from the multiple customer's purchase history data, e.g., from the transaction data for pretraining 2024 logic circuitry.

The training tools 2030 may also comprise fuzzy 2034 logic circuitry. The fuzzy 2034 logic circuitry may modify values of the transaction data from the multiple customer's purchase history data. For instance, the fuzzy 2034 logic circuitry may make small changes to locations of purchases such as moving the location across the street, values of transactions such as increasing or decreasing the value by 10% to 20%, modifying the time of the transaction, modifying the day of the transaction, and/or the like. Slight modifications to values of transaction data can, advantageously, improve the robustness of the fraud detection model 2040 and increase security by reducing the ability to identify customers based on the transaction data.

In several embodiments, the fuzzy 2034 logic circuitry may modify values occasionally or periodically. For instance, some embodiments may modify one value of one percent of the transactions received for the pretrain 2022 logic circuitry. Other embodiments may modify multiple values in five percent of the transactions. The frequency of such modifications and count of modifications per set of training data may depend on design parameters of the fraud detection model 2040.

In some embodiments, the fraud detection logic circuitry 2000 may pretrain the fraud detection model 2040 with synthesized transaction data in addition to or in lieu of customer data. In such embodiments, the training tools 2030 may synthesize transaction data based on multiple customer's transaction data or purchase history.

The training 2050 logic circuitry may reside at the model location 2090 and may train fraud detection models with transaction data 2005 from new transactions. The training 2050 logic circuitry may comprise non-fraud 2052 logic circuitry and fraud 2054 logic circuitry. The non-fraud 2052 logic circuitry may train the fraud detection model 2040 based on modified transaction data 2007 from the vote management 2060. The modified transaction data 2007 may be the transaction data 2005 but with portions of the data obscured to anonymize the transaction data 2005. In particular, the training 2050 logic circuitry may wait a period of time from receipt of the modified transaction data 2007 or from transmission of a vote responsive to receipt of the modified transaction data 2007. If no communication is received from the fraud detection logic circuitry 2000 from the server location 2095 that indicates that the modified transaction data 2007 represents a fraudulent transaction, the training 2050 logic circuitry may determine that the modified transaction data 2007 represents non-fraudulent transaction data for the purposes of training.

The fraud 2054 logic circuitry may also train the fraud detection model 2040 based on the modified transaction data 2007. After voting about fraudulence of the modified transaction data 2007, if the vote evaluation 2076 logic circuitry determines that the transaction data 2005 likely represents a fraudulent transaction, the fraud confirmation 2078 logic circuitry may transmit a message to the customer associated with the transaction data 2005 to confirm that the transaction corresponding to the transaction data 2005 is fraudulent or non-fraudulent. If the customer confirms that the transaction is fraudulent, the fraud training 2026 logic circuitry may transmit the transaction data 2005 or the modified transaction data 2007 to the fraud 2054 logic circuitry for each fraud detection model 2040 in the clusters associated with the transaction data 2005. In other embodiments, the fraud training 2026 logic circuitry may transmit the transaction data 2005 or the modified transaction data 2007 to the fraud 2054 logic circuitry for more than one fraud detection model 2040 in the clusters associated with the transaction data 2005.

The vote management 2060 may receive transaction data 2005, prepare and/or gather data from the transaction data 2005 for conducting a vote, transmit the data to fraud detection models at their respective locations such as the fraud detection model 2040 at the model location 2090, which may be in customer devices and/or servers. The vote management 2060 may comprise logic circuitry such as obscure 2062, cluster identification 2070, vote request 2072, vote identification 2074, vote evaluation 2076, fraud confirmation 2078, vote determination 2080, and vote cast 2082.

After receipt of transaction data 2005 for a recent transaction, the obscure 2062 logic circuitry may obscure or anonymize customer information that will be included in modified transaction data 2007 to transmit to the fraud detection models. The obscure 2062 logic circuitry may comprise hash 2064 logic circuitry to hash, e.g., a customer identification, a transaction identification, other identifications that can associate a customer with the transaction data 2005, and/or the like. For example, in several embodiments, hash 2064 logic circuitry may hash one or more portions of the transaction data 2005 based on a hash function such as a cryptographic hash function.

The obscure 2062 logic circuitry may also comprise or alternatively comprise encrypt 2066 logic circuitry to encrypt portions of the transaction data 2005 such as a customer identification, a transaction identification, other identifications that can associate a customer with the transaction data, and/or the like. For instance, the encrypt 2066 logic circuitry may encrypt any data that is included in the modified transaction data 2007 to identify the transaction to the vote identification 2072 logic circuitry when the vote management 2060 receives votes from fraud detection models. In other words, the vote management 2060 may mange voting for multiple new transactions concurrently for the same or different clusters. When the vote management 2060 receives a vote from the fraud detection model 2040, the vote management 2060 matches the customer identification, transaction identification, and/or the like, with the corresponding transaction.

The cluster identification 2070 logic circuitry may identify the one or more clusters associated with the transaction. For instance, the vote management 2060 may receive transaction data 2005 descriptive of the customer transaction. The transaction data 2005 may include a customer identification and/or a transaction identification. The cluster identification 2070 logic circuitry may identify the customer's profile and then identify the customer's membership in one or more clusters. In other embodiments, the vote management 2060 may receive the transaction data 2005 and the transaction data 2005 may include cluster identifications for the customer that conducted the transaction. The cluster identification 2070 logic circuitry may parse the transaction data 2005 to determine the cluster identifications.

After determining one or more cluster identification(s) associated with the transaction data 2005, the vote request 2072 logic circuitry may generate a communication or message to transmit to customer devices associated with the cluster identifications. The communication or message may include an instruction or application program interface (API) call to instruct the fraud detection logic circuitry 2000 at the model location 2090, such as on a customer device, to evaluate modified transaction data 2007 and respond with a vote that comprises data such as a bit or a set of bits that indicate that the modified transaction data 2007 represents a non-fraudulent transaction or represents a fraudulent transaction.

In many embodiments, the vote request 2072 logic circuitry may cause the communication or message to transmit to customer devices of more than one customer associated with the cluster identification(s). In such embodiments, the more than one customer may comprise a count of or a portion of a total number of customers in the group of customers associated with each cluster identified by the cluster identification(s).

The fraud detection logic circuitry 2000 at the model location 2090 may receive the vote request from the vote request 2072 logic circuitry at the server location 2095. The fraud detection logic circuitry 2000 at the model location 2090 may comprise logic circuitry including vote determination 2080 and vote cast 2082. The vote determination 2080 logic circuitry may receive the modified transaction data 2007 from the vote request 2072 logic circuitry and provide the modified transaction data 2007 to an input of the fraud detection model 2040 to determine whether the model considers the transaction associated with the modified transaction data 2007 to be fraudulent or non-fraudulent.

The vote cast 2082 logic circuitry may cast a vote about the fraudulence of a transaction associated with the modified transaction data 2007 by transmitting a vote to the vote management 2060 at the server location 2095. For instance, the vote cast 2082 logic circuitry may generate a communication that includes a bit such as a logical zero to indicate that the transaction is not fraudulent or a bit such as a logical one to indicate that the transaction is fraudulent. Furthermore, the communication may include a hashed or encrypted identification to associate the vote with the transaction data 2005. For instance, the communication may include an encrypted customer identification and/or an encrypted transaction identification.

The vote identification 2074 logic circuitry may match votes received from the fraud detection models with the transaction data 2005. In some embodiments, the vote identification 2074 logic circuitry may compare a hashed identification with the identification received from the fraud detection models. In other embodiments, the vote identification 2074 logic circuitry may decrypt encrypted identifications received from the fraud detection models and compare the decrypted identifications with the identifications of the transaction data 2005.

The vote evaluation 2076 logic circuitry may receive votes from more than one fraud detection model 2040 and determine whether to contact the customer associated with the transaction, based on the votes, to confirm that the transaction is fraudulent or non-fraudulent. In some embodiments, if one vote indicates that the modified transaction data 2007 represents a fraudulent transaction, the vote evaluation 2076 logic circuitry may instruct the fraud confirmation 2078 logic circuitry to contact the customer to determine if the transaction is fraudulent. In several embodiments, a vote threshold may be set by the fraud detection logic circuitry 2000 to establish when the customer is contacted about a transaction. For example, the vote threshold may be a vote count or a percentage of the votes received. Note that the number of votes received may not match the number of votes requested, some of the customer devices (or servers) may not be available for some reason such as the customer device is powered down, the customer device has no connectivity to a network, the customer device is installing a new operating system, and/or the like.

The fraud confirmation 2078 logic circuitry may be responsive to the vote evaluation 2076 logic circuitry to contact a customer when one or more votes indicate that the modified transaction data 2007 represents a fraudulent transaction. For instance, the fraud confirmation 2078 logic circuitry may generate a message such as an email message, a text message, and/or a voice message to inform the customer about the transaction details and to request that the customer either contact a company or otherwise confirm whether the transaction associated with the transaction data 2005 is fraudulent or non-fraudulent. In one embodiment, the fraud confirmation 2078 logic circuitry may generate and cause to transmit an email that includes two links, one link to indicate that the transaction is fraudulent and another link to indicate that the transaction is non-fraudulent. In another embodiment, the fraud confirmation 2078 logic circuitry may generate and cause to transmit, a text message to the customer's messaging account such as text on a cellular phone to either call a company or text one or more characters such as "yes" to indicate that transaction is fraudulent or "no" to indicate that the transaction is non-fraudulent. In further embodiments, the fraud confirmation 2078 logic circuitry may issue an application program interface call to instruct an application on a customer device to notify the customer. Some of these embodiments may allow the customer to set preferences for the application as to how the customer should be contacted in case of fraudulent transaction. In one embodiment, the vote management 2060 logic circuitry at the model location 2090 may include notify logic circuitry to notify the customer of the potentially fraudulent transaction and request the customer to confirm either that the transaction is fraudulent or is non-fraudulent.

The fraud detection model 2040 may comprise a mathematical model or machine learning model such as a neural network, a statistical model, or a clustering model that is pretrained with customer transaction data from multiple customers by the pretrain 2022 logic circuitry. Based on the pretraining, the fraud detection model 2040 may identify fraudulent transactions and/or non-fraudulent transactions based on transaction data 2005 or modified transaction data 2007 that is descriptive of the transaction. The fraud detection model 2040 may comprise, for instance, a k-nearest neighbors algorithm, Density-based spatial clustering of applications with noise (DBSCAN) algorithm, an Ordering Points To Identify the Clustering Structure (OPTICS) algorithm, and/or the like. In further embodiments, the fraud detection model 2040 may comprise other statistical algorithms such as a probabilistic classification algorithm, a binary classification algorithm, or other classification algorithm.

Figure 3B:
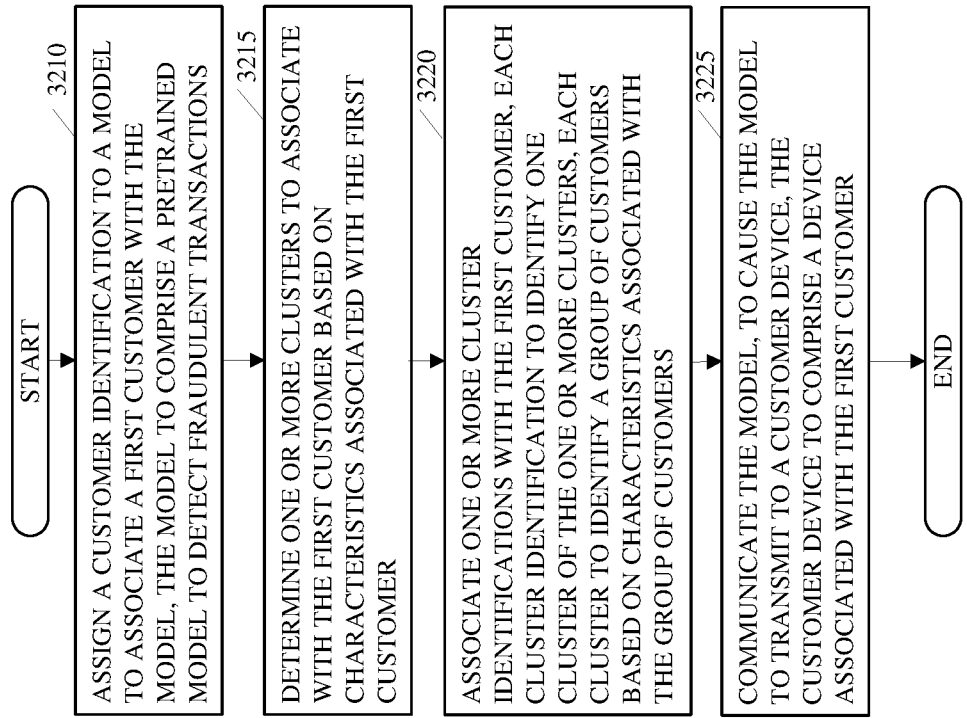
Figure 3A:
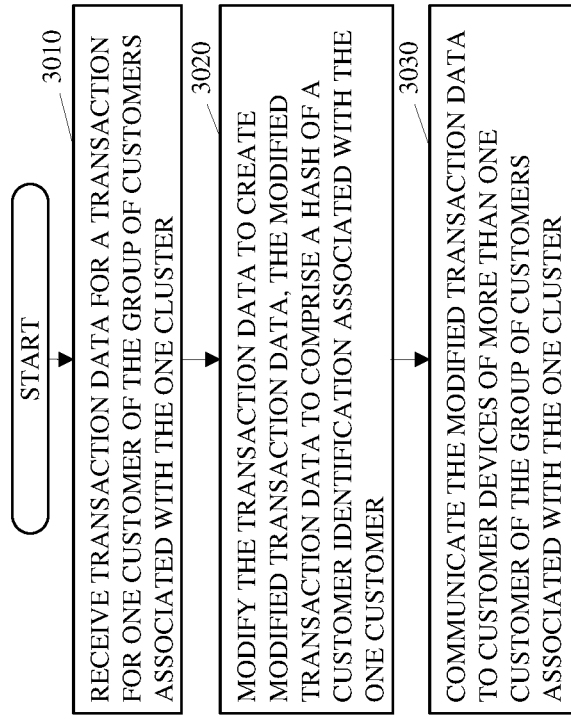

FIGS. 3A-F depict flowcharts of embodiments for fraud detection logic circuitry, such as the fraud detection logic circuitry shown in FIGS. 1A-1B, 1D-E, and 2. FIG. 3A illustrates a flowchart to distribute data about a customer transaction to multiple fraud detection models to obtain votes from the multiple fraud detection models. The flowchart starts with receiving transaction data for a transaction for one customer of the group of customers associated with the one cluster (element 3010). In other words, the fraud detection logic circuitry may receive information about a transaction conducted by a customer in the form of transaction data and that customer is associated with the one cluster. In some embodiments, the one cluster is identified by the transaction data or by data that accompanies the transaction data. In other embodiments, fraud detection logic circuitry may determine the one cluster by identifying an association between the customer and the one cluster in, e.g., a customer profile associated with the customer.

After receiving the transaction data, the fraud detection logic circuitry may modify the transaction data to create modified transaction data, the modified transaction data to comprise a hash of a customer identification associated with the one customer (element 3020). In other words, the fraud detection logic circuitry may obscure or anonymize the information in the transaction data that identifies the customer or that can be used to identify the customer. In some embodiments, the hash may be a cryptographic hash such as a message authentication code (MAC), a secure hash algorithm (SHA), and/or the like.

Upon creating the modified transaction data, the fraud detection logic circuitry may communicate the modified transaction data to customer devices of more than one customer of the group of customers associated with the one cluster (element 3030). The fraud detection logic circuitry may transmit or cause to be transmitted messages to multiple customer devices associated with the one cluster to obtain votes from those devices about whether the modified transaction data represents a fraudulent transaction or a non-fraudulent transaction.

FIG. 3B illustrates a flowchart to establish a system for detecting a fraudulent transaction. The flowchart begins with a fraud detection logic circuitry assigning a customer identification to a model to associate a first customer with the model, the model to comprise a pretrained model to detect fraudulent transactions (element 3210). In many embodiments, the model is an instance of a pretrained model and the customer identification associates or identifies the model as that specific customer's model. Associating the model with the specific customer connects or relates the model with the customer's profile, which associates the model with each cluster in which the specific customer is a member. Associating the model with the specific customer determines subsequent training and voting by the model.

The fraud detection logic circuitry may also determine one or more clusters to associate with the first customer based on characteristics associated with the first customer (element 3215). In some embodiments, the customers that agree to participate in the fraud detection service may be assigned to one or more clusters prior to assigning a model to the customer. In other embodiments, the fraud detection logic circuitry may assign the customer to one or more clusters concurrently with assigning a model to the customer or after assigning a model to the customer.

Determining one or more clusters to associate with a customer may involve searching for keywords in the transaction or purchase history of the customer or gathering common words in the customer's profile and purchase history that relate to a characteristic associated with a cluster. For example, a keyword search of the purchase history may include "computer" to find a count of the number of times that purchases in the customer's purchase history involved the purchase of computer equipment or accessories or that involved a transaction with a store that is identified with the word "computer" such as a category that identifies the store as a computer store or a seller of computers.

One embodiment implements word clustering from the customer's profile and/or the customer's purchase history. For instance, a word clustering algorithm may collect terms from the customer's purchase history and determine a count of the terms. Some of the terms that occur frequently in the customer's profile or purchase history may match or otherwise relate to characteristics associated with one or more of the clusters. The fraud detection logic circuitry may select one or more clusters to associate with the customer based on counts of the frequently found terms in the customer's profile and purchase history.

Once the fraud detection logic circuitry identifies one or more clusters to associate with the customer, the fraud detection logic circuitry may associate one or more cluster identifications with the first customer. Each cluster identification may identify one cluster of the one or more clusters and each cluster may identify a group of customers based on characteristics associated with the group of customers (element 3220). In several embodiments, the fraud detection logic circuitry may store the cluster identifications in the customer's profile or otherwise associate the cluster identifications with the customer's profile. For instance, one embodiment may maintain a list of clusters and associate customer identifications with each cluster identification in the list.

After assigning the one or more clusters to a customer, the fraud detection logic circuitry may communicate the model, to cause the model to transmit to a customer device, the customer device to comprise a device associated with the first customer (element 3225). In many embodiments, the fraud detection logic circuitry may communicate or pass the model along with customer contact information or the customer identification to a communication interface, so the communication interface may transmit the model to a customer device associated with the customer. For example, the fraud detection logic circuitry may issue an application program interface call to transmit the model to the customer device so the application program interface call communicates the model to an application program to transmit the model to the customer device. The application program may reside on the same device as the fraud detection logic circuitry or a different device such as a different server or set of servers.

FIG. 3C illustrates a flowchart for collecting or receiving votes from customer devices or servers, depending on the location of the fraud detection model. The flowchart begins with receiving responses from the customer devices of the more than one customer about the modified transaction, the responses to identify the modified transaction as a fraudulent transaction or a non-fraudulent transaction (element 3310). Based on the responses and a vote threshold, the fraud detection logic circuitry may determine that the modified transaction data represents a fraudulent transaction (element 3320). In other words, the fraud detection logic circuitry may compare a count, percentage, or other portion of the votes from the fraud detection models with a vote threshold to determine if the customer should be contacted to determine if the transaction is fraudulent. For example, the fraud detection logic circuitry may count the number of votes that indicate the transaction data or modified transaction data represents a fraudulent transaction and determine a ratio based on a count of the votes or responses that indicate that the transaction data or modified transaction data represents a non-fraudulent transaction. The fraud detection logic circuitry may then compare the ratio or a percentage based on the ratio to the vote threshold to determine whether to contact the customer.

In response, a determination that the modified transaction data represents a fraudulent transaction, the fraud detection logic circuitry may determine to communicate with the one customer (element 3330). In other words, after determining that the votes indicate the transaction data or modified transaction data represents a fraudulent transaction, the fraud detection logic circuitry may generate a message to transmit to the one customer and cause the message to transmit to the customer via, e.g., one or more application program interface calls. For instance, the fraud detection logic circuitry may issue an application program interface call to communicate the message via a short message service (SMS) to the customer's cell phone, via an email service, via a voice service to one or more of the customer's phone numbers, and/or the like.

FIG. 3D illustrates a flowchart for pretraining a fraud detection model such as the fraud detection models shown in FIGS. 1A, 1C, 1E, and 2. The flowchart may begin with training the model to detect fraudulent transactions with sets of transactions from the more than one customer, wherein the model comprises a neural network, a statistical model, or a clustering model (element 3410). For example, the fraud detection logic circuitry may selectively gather transaction data from multiple customers' purchase history to provide transactions for training data that demonstrate variances such as variances in purchase prices, in distances of purchases from a home or office address, in types of purchases, and/or in any other factors that affect decisions made by the model.

FIG. 3E illustrates a flowchart to vote and train based on new transaction data. The flowchart begins with receiving, at a customer device associated with a first customer, transaction data for an anonymized customer associated with a first cluster. The transaction data may describe a purchase made by the anonymized customer and the first customer may also be associated with the first cluster (element 3510). In other words, transaction data for the anonymized customer is sent to the customer device of the first customer to vote on whether the transaction represents a fraudulent transaction because the first customer is in the same cluster as the anonymized customer.

Upon receipt of the transaction data, the fraud detection logic circuitry of the customer device may determine, via a model based on the transaction data, that the purchase is fraudulent or that the purchase is non-fraudulent. To accomplish this, the model is pretrained detect fraudulent transactions based on a purchase history of multiple customers. (element 3515). The fraud detection logic circuitry may then communicate, in response to receipt of the transaction data, a message to indicate that the purchase is fraudulent or that the purchase is non-fraudulent based on the transaction data, the message to identify the transaction with encoded data (element 3520). For instance, the customer device may transmit the vote back to the fraud detection logic circuitry of a server, so the fraud detection logic circuitry of the server can tally the votes from multiple customers in the same cluster to determine how to proceed. The customer device may transmit an encoded customer identification along with the vote. In some embodiments, the customer identification is encoded with a cryptographic hash or via another encoding scheme.

Once the customer device casts a vote, the fraud detection model of the server may determine if the transaction is fraudulent or not. If the transaction is non-fraudulent, the server may do nothing or may transmit an indication of the same to the customer devices to inform the customer devices how to train with the transaction data.

In some embodiments, the fraud detection logic circuitry of the customer device may train the model, after confirmation that the purchase is fraudulent or that the purchase is non-fraudulent, in response to receipt of the transaction data (element 3525). Since most transactions are non-fraudulent, the fraud detection logic circuitry of the customer device may train with the transaction data as a non-fraudulent transaction if the fraud detection logic circuitry of the customer device does not receive an indication to the contrary from the fraud detection logic circuitry of the server within, e.g., 24 hours.

Figure 4:
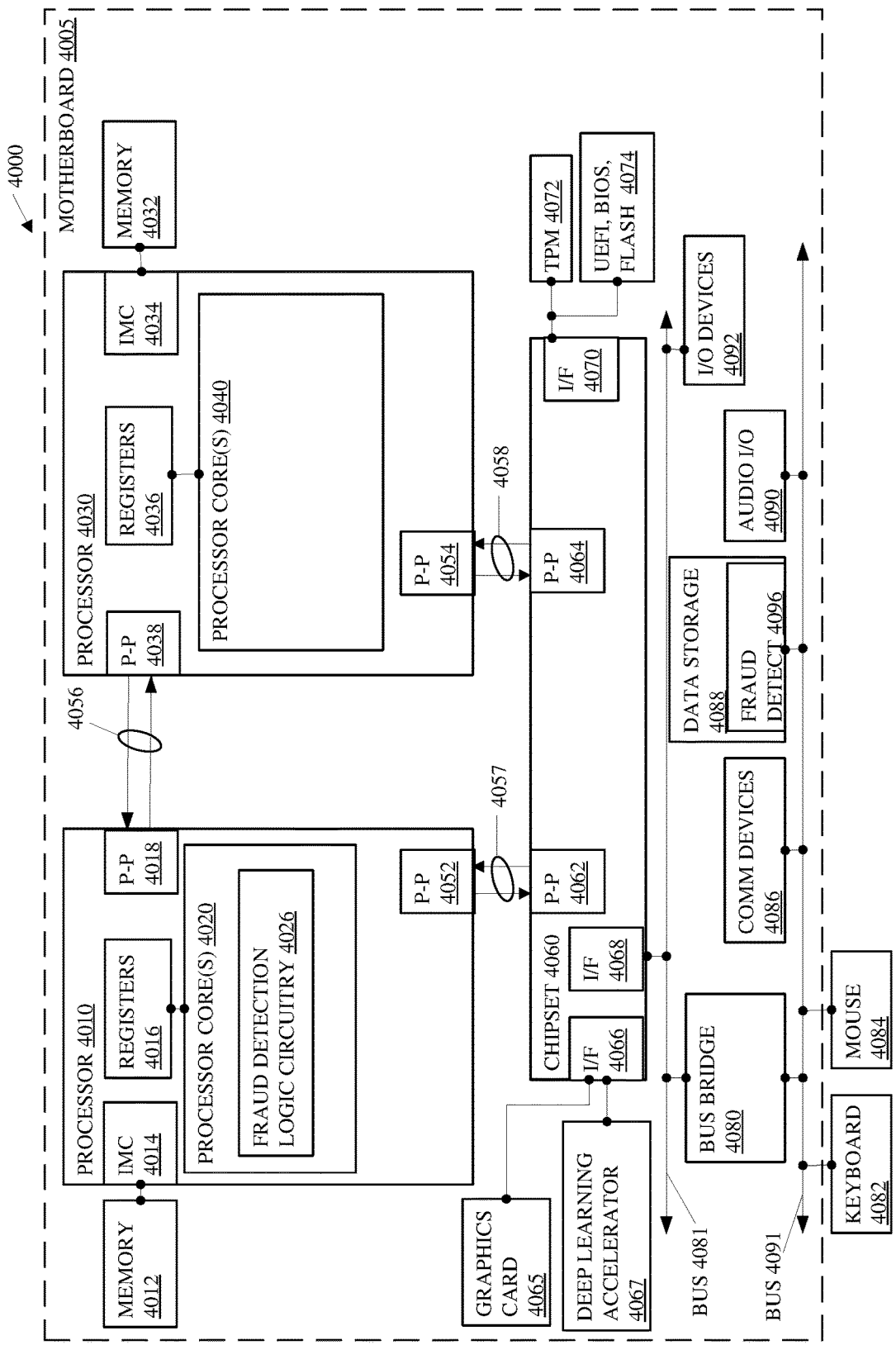
FIG. 4 depicts an embodiment of a system including a multiple-processor platform, a chipset, buses, and accessories such as the server shown in FIGS. 1A-1B and 1D-E.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a fraud detection logic circuitry 4026 such as the fraud detection logic circuitry 1022 shown in FIG. 1B. The fraud detection logic circuitry 4026 may represent circuitry configured to implement the functionality of fraud detection for neural network support within the processor core(s) 4020 or may represent a combination of the circuitry within a processor and a medium to store all or part of the functionality of the fraud detection logic circuitry 4026 in memory such as cache, the memory 4012, buffers, registers, and/or the like. In several embodiments, the functionality of the fraud detection logic circuitry 4026 resides in whole or in part as code in a memory such as the fraud detection logic circuitry 4096 in the data storage unit 4088 attached to the processor 4010 via a chipset 4060 such as the fraud detection logic circuitry 1125 shown in FIG. 1B. The functionality of the fraud detection logic circuitry 4026 may also reside in whole or in part in memory such as the memory 4012 and/or a cache of the processor. Furthermore, the functionality of the fraud detection logic circuitry 4026 may also reside in whole or in part as circuitry within the processor 4010 and may perform operations, e.g., within registers or buffers such as the registers 4016 within the processor 4010, or within an instruction pipeline of the processor 4010.

In other embodiments, more than one of the processor 4010 and 4030 may comprise functionality of the fraud detection logic circuitry 4026 such as the processor 4030 and/or the processor within the deep learning accelerator 4067 coupled with the chipset 4060 via an interface (I/F)

4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an input/output (I/O) bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an I/O controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the fraud detection logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
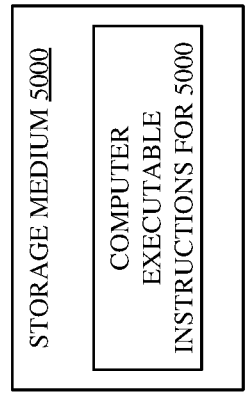
FIGS. 5-6 depict embodiments of a storage medium and a computing platform such as the server and the customer devices shown in FIGS. 1A-B and 1D-E.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
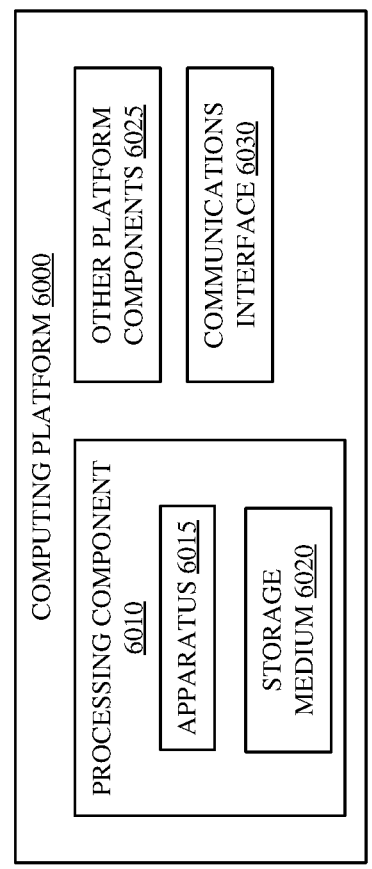

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may can wake up a main radio of the computing platform 6000.

According to some examples, processing component 6010 may execute processing operations or logic for apparatus 6015 described herein such as the fraud detection logic circuitry 1115 illustrated in FIGS. 1A and 1B. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:
1. A mobile device, comprising:
 memory; and
 a logic circuitry coupled with the memory, the logic circuitry to:
  receive, from a server, a customer identification to associate the mobile device to a pretrained model, the pretrained model is trained to identify fraudulent transactions;
  receive, from the server, a cluster identification to associate the mobile device to a first cluster that comprises a plurality of customers, wherein a first customer associated with the mobile device is one of the plurality of customers;
  receive transaction data for an anonymized customer from the first cluster, the transaction data to describe a purchase made by the anonymized customer;
  determine, using the model, based on the transaction data, a vote indicative whether the purchase is fraudulent or that the purchase is non-fraudulent, wherein the model is pretrained to detect fraudulent transactions based on a purchase history of the plurality of customers in the first cluster;
  communicate, in response to a receipt of the transaction data, a message comprising the vote to indicate that the purchase is fraudulent or that the purchase is non-fraudulent based on the transaction data, the message to identify the transaction data with encoded data; and update the model based on an indication from the server, wherein the server determines that the purchase is fraudulent or that the purchase is non-fraudulent based on a plurality of votes from a plurality of customer devices, wherein updating of the model includes:
randomly selecting a plurality of transactions associated with the plurality of customers, including receiving another transaction data associated with the plurality of transactions from a plurality of customer devices associated with the plurality of customers in the first cluster;
modifying and encrypting at least a portion of each received another transaction data associated with the plurality of transactions; and
executing at least one of supervised or unsupervised training of the model using the modified and encrypted at least a portion of each another transaction data associated with the plurality of transactions.

2. The mobile device of claim 1, wherein the encoded data is a customer identification encoded with a cryptographic hash, the customer identification assigned to the model to identify the first customer.

3. The mobile device of claim 1, wherein the model is a recurrent neural network pretrained by a server on a series of transactions to predict a probability of occurrence for the purchase.

4. The mobile device of claim 3, the logic circuitry to determine that the purchase is fraudulent based on the model, applied to the transaction data, predicting the purchase is outside the probability of occurring.

5. The mobile device of claim 3, the logic circuitry to determine that the purchase is not fraudulent based on the model, applied to the transaction data, predicting the purchase is within the probability of occurring.

6. The mobile device of claim 3, wherein the recurrent neural network comprises a plurality of layers one of which is an input layer to receive the transaction data, the input layer to provide the transaction data as tensor data and the remaining layers to determine whether the purchase is fraudulent or not fraudulent.

7. A computing implemented method, comprising:
receiving, by a mobile device, from a server, a customer identification to associate the mobile device to a pretrained model, the pretrained model is trained to identify fraudulent transactions using fraud detection logic circuitry of the mobile device;
receiving, from the server, a cluster identification to associate the mobile device to a cluster that comprises a plurality of customers, wherein a first customer associated with the mobile device is one of the plurality of customers;
receiving, by the mobile device comprising fraud detection logic circuitry, transaction data for an anonymized customer associated with the cluster the transaction data to describe a purchase made by the anonymized customer;
determining, by the fraud detection logic circuitry applying the model at the mobile device, a vote indicative of whether the purchase is fraudulent or that the purchase is non-fraudulent, wherein the model is pretrained to detect fraudulent transactions based on a purchase history of multiple customers in the plurality of customers in the cluster;
communicating, in response to a receipt of the transaction data, a response comprising the vote to indicate that the purchase is fraudulent or non-fraudulent based on application of the model by the mobile device to the transaction data, the response to identify the transaction with encoded data; and
updating the model, by the fraud detection logic circuitry, based on an indication from the server, wherein the server determines that the purchase is fraudulent or that the purchase is non-fraudulent based on a plurality of votes from a plurality of customer devices, wherein updating the model comprises training the model with the transaction data, wherein pretraining and training of the model include:
randomly selecting a plurality of transactions associated with the multiple customers, including receiving another transaction data associated with the plurality of transactions from a plurality of customer devices associated with the plurality of customers in the first cluster;
modifying and encrypting at least a portion of each received another transaction data associated with the plurality of transactions; and
executing at least one of supervised or unsupervised training of the model using the modified and encrypted at least a portion of each another transaction data associated with the plurality of transactions.

8. The computing implemented method of claim 7, wherein the encoded data is a customer identification encoded with a cryptographic hash, the customer identification assigned to the model to identify the first customer.

9. The computing implemented method of claim 7, wherein the model is a recurrent neural network pretrained by a server on a series of transactions to predict a probability of occurrence for the purchase.

10. The computing implemented method of claim 9, comprising determining that the purchase is fraudulent based on the model, applied to the transaction data, predicting the purchase is outside the probability of occurring.

11. The computing implemented method of claim 9, comprising determining that the purchase is not fraudulent based on the model, applied to the transaction data, predicting the purchase is within the probability of occurring.

12. The computing implemented method of claim 9, wherein the recurrent neural network comprises a plurality of layers one of which is an input layer to receive the transaction data, the input layer to provide the transaction data as tensor data and the remaining layers to determine whether the purchase is fraudulent or not fraudulent.

13. A non-transitory machine-readable medium containing instructions, which when executed by a processor, cause the processor to perform operations, the operations to:
receive, via an interface of a mobile device, a customer identification to associate the mobile device to a pretrained model, the pretrained model is trained to identify fraudulent transactions;
receive, via the interface of the mobile device, a cluster identification to associate the mobile device to a first cluster that comprises a plurality of customers, wherein a first customer associated with the mobile device is one of the plurality of customers;
receive, via the interface of the mobile device, transaction data for an anonymized customer associated with the first cluster, the transaction data to describe a purchase made by the anonymized customer;

determine, by the model based on the transaction data, a vote indicating that the purchase is fraudulent or that the purchase is non-fraudulent, wherein the model is pretrained to detect fraudulent transactions based on a purchase history of multiple customers in the plurality of customers in the first cluster;

communicate, in response to a receipt of the transaction data, a message comprising the vote to indicate that the purchase is fraudulent or that the purchase is non-fraudulent based on the transaction data, the message to identify the transaction data with encoded data; and train the model with the transaction data, based on receipt of an indication of whether the purchase is fraudulent or non-fraudulent based on a plurality of votes from a plurality of customer devices, wherein training of the model includes:

randomly selecting a plurality of transactions associated with the multiple customers, including receiving another transaction data associated with the plurality of transactions from a plurality of customer devices associated with the plurality of customers in the first cluster;

modifying and encrypting at least a portion of each received another transaction data associated with the plurality of transactions; and executing at least one of supervised or unsupervised training of the model using the modified and encrypted at least a portion of each another transaction data associated with the plurality of transactions.

14. The machine-readable medium of claim 13, wherein the encoded data is a customer identification encoded with a cryptographic hash, the customer identification assigned to the model to identify the first customer.

15. The machine-readable medium of claim 13, the processor to receive the model and the customer identification from a server, the customer identification assigned to the model by the server to identify the first customer.

16. The machine-readable medium of claim 13, wherein the model is a recurrent neural network pretrained by a server on a series of transactions to predict a probability of occurrence for the purchase, and the processor to retrain the model with the transaction data.

17. The machine-readable medium of claim 16, the processor to determine that the purchase is fraudulent based on the model, applied to the transaction data, predicting the purchase is outside the probability of occurring, or determine that the purchase is not fraudulent based on the model, applied to the transaction data, predicting the purchase is within the probability of occurring.

18. The machine-readable medium of claim 16, wherein the recurrent neural network comprises a plurality of layers one of which is an input layer to receive the transaction data, the input layer to provide the transaction data as tensor data and the remaining layers to determine whether the purchase is fraudulent or not fraudulent.

* * * * *